Nov. 10, 1959 D. O. DAVIES 2,911,831
TEMPERATURE-SENSITIVE ARRANGEMENT FOR GAS TURBINE ENGINES
Filed May 10, 1954 2 Sheets-Sheet 1

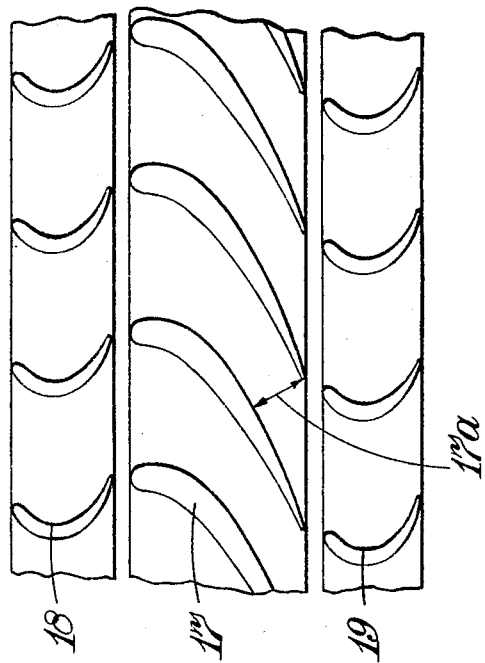
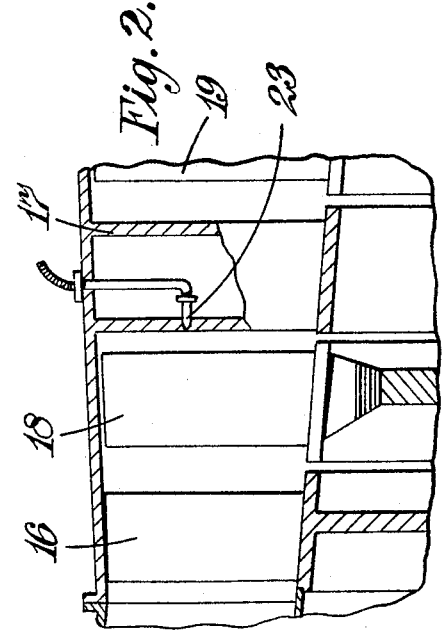

United States Patent Office 2,911,831
Patented Nov. 10, 1959

2,911,831

TEMPERATURE-SENSITIVE ARRANGEMENT FOR GAS TURBINE ENGINES

David Omri Davies, Kingsway, Derby, England, assignor to Rolls-Royce Limited, Derby, England, a British company Application May 10, 1954, Serial No. 428,643

Claims priority, application Great Britain May 21, 1953

2 Claims. (Cl. 73—343)

This invention relates to temperature-sensitive arrangements for use with gas-turbine engines, for example, arrangements for measuring the working temperature in the engine or for controlling the working temperature in the engine.

Heretofore it has been the practice to locate a temperature-sensitive element in the exhaust from the turbine at a point between the turbine and the final outlet to atmosphere of the exhaust gases.

It is well-known that some variation of temperature occurs in the jet pipe of jet-propulsion gas turbine engines when the final nozzle is not choked, this variation taking place as a result of variations in the forward speed and variations in the altitude of an aircraft fitted with the engine, and also as a result of variations of ambient atmospheric temperature. It is also found that with some engines having two or more independently-rotating turbines there is a variation of temperature in the jet pipe even though the final nozzle is choked; for example this may occur in an engine having a high-pressure turbine and a low-pressure turbine whereof the low-pressure turbine drives a propeller or other external load; as another example this may occur in a compound engine having a low-pressure compressor driven by a low-pressure turbine and a high-pressure compressor driven by a high-pressure turbine, where the rotational speed of the low-pressure rotor is controlled independently of that of the high-pressure rotor, as for example by adjustment of the area of a variable-area jet nozzle.

It has been found that this variation in temperature is very marked with some jet-propulsion engines which have associated with them a propeller driven by the engine and whereof the velocity of the exhaust gas jet from the final nozzle is low. It has hitherto been the practice to provide the pilot of an aircraft fitted with such an engine with a chart which shows corrections which have to be made for different forward speeds and altitude conditions. It has also been suggested that the temperature-sensitive element be located upstream of the turbine, but this arrangement is disadvantageous in that the temperatures to which the temperature-sensitive element is subjected are very high.

The present invention has for an object to avoid the above difficulties in gas-turbine engines comprising a multi-stage turbine.

According to the present invention, in a gas-turbine engine having a multi-stage turbine, it is arranged that the nozzle guide vanes associated with a low-pressure stage of the turbine are choked in operation of the engine, and a temperature-sensitive element of a temperature-sensitive arrangement is located in the leading edge of a nozzle guide vane of the low-pressure stage, thereby to sense the temperature at the leading edge of the low-pressure nozzle guide vane.

One manner in which the invention may be carried out will now be described with reference to the accompanying drawings, in which—

Figure 2 is a part of Figure 1 to a large scale, and

Figure 3 is a developed view of a typical form of two sets of turbine rotor blades and the intermediate nozzle guide vanes.

Figure 1:
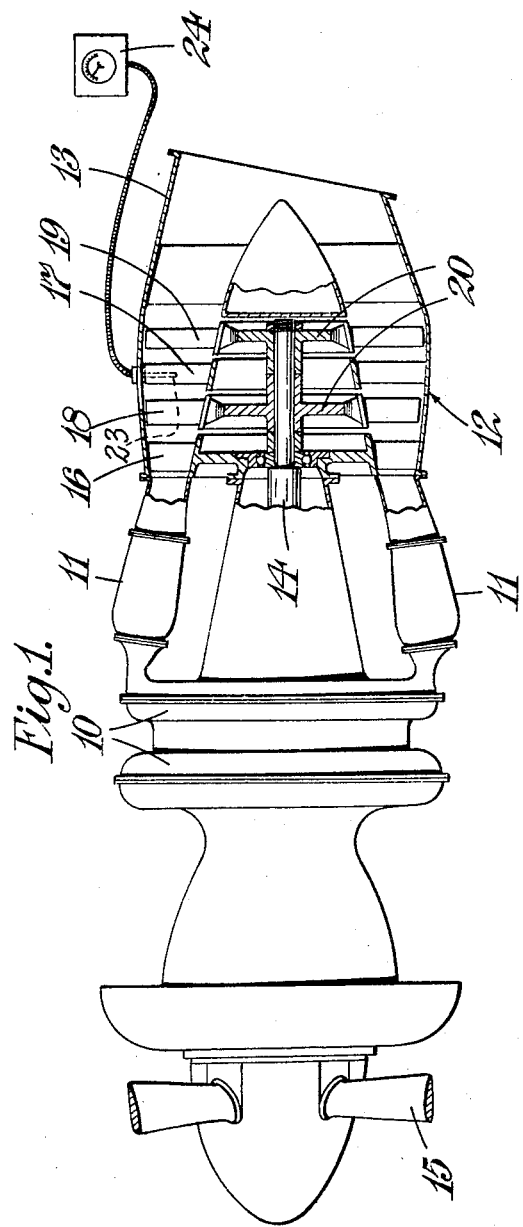
Figure 1 illustrates diagrammatically a gas-turbine engine.

Referring first to Figure 1 of the drawings, the engine comprises a compressor 10, shown as a two-stage centrifugal compressor, combustion equipment 11 receiving compressed air from the compressor 10 to be burnt with fuel therein, a turbine 12 receiving the combustion gases from the combustion equipment 11, thereby to be driven, and an exhaust arrangement 13 affording an outlet nozzle to atmosphere for the turbine exhaust gases. The turbine 12 drives the compressor 10 through a shaft 14 and also drives a propeller 15.

The turbine 12 is a two-stage axial-flow turbine, and the turbine comprises two sets of stationary nozzle guide vanes 16, 17 one for each turbine stage, and downstream of the sets of nozzle guide vanes 16, 17, corresponding sets of rotor blades 18, 19 respectively.

The turbine blades 18, 19 are mounted at the peripheries of turbine discs 20 secured on the shaft 14. The turbine stages are designed so that over that part of the engine speed range which is normally used in operation the nozzle guide vanes 17 of the low-pressure turbine are choked, and Figure 3 shows typical sections for the rotor blades 18, 19 and guide vanes 17.

A temperature-sensitive element 23 of a temperature-sensitive arrangement is disposed to sense the temperature of the working fluid channel of the engine at a point between the nozzle guide vanes 16 of the high-pressure turbine and the nozzle guide vanes 17 of the low-pressure turbine and is for this purpose located as shown in Figures 1 and 2 in the leading edge of a hollow nozzle guide vane 17 so as to sense the temperature at the leading edge of the vane, that is the temperature at a point upstream of the throat (indicated at 17a Figure 3) between the vanes 17 at which the sonic velocity occurs. More than one temperature-sensitive element, such as 23, may be used, and these may be of any known or convenient form, such as thermocouples or electrical resistance elements, and may be connected to any known or convenient indicating or control means 24. For example where the temperature-sensitive element is a thermocouple, a moving coil millivoltmeter may be used, while where an electrical resistance element is used the indicator may be in the form of a Wheatstone bridge.

By locating the temperature-sensitive element 23 in accordance with this invention, the difficulties above described are avoided, and an accurate indication of the high temperature of the gases in the combustion chambers 11 or impinging on the high pressure turbine blades 18 is obtained without subjecting the temperature sensitive element 23 to the high temperature. If the temperature sensitive element is placed in the tail pipe, i.e. beyond the low-pressure turbine, the correlation between the measured temperature and the high temperature of the gas impinging on the high pressure turbine is not good because of the adverse effects of aircraft speed and of varying ambient pressure and temperature and because in a turbine in which the low-pressure nozzle guide vanes become choked in operation, changes in conditions downstream of the choked vanes have a very small effect on conditions upstream of the choked vanes. By causing the low pressure turbine to become choked in operation and by placing the temperature sensitive element 23 within the leading edge of the nozzle guide vanes of the low pressure compressor, a temperature is sensed which is substantially lower than and has a good correlation with the high temperature of the gases impinging on the high pressure turbine. This correlation of the sensed temperature and the high temperature is substantially unaffected by variations of ambient temperature and pressure or by changes of aircraft speed. Furthermore it is found that the correlation of the temperature due to these causes is only affected to a small degree at engine rotational speeds just below the speed at which the nozzle guide vanes 17 become choked.

For instance with one engine in which the jet pipe temperature is of the order of 750° K. at a certain rotational speed, the difference between the temperature in the jet pipe when an aircraft fitted with the engine is stationary at sea level and the temperature in the jet pipe when flying at 300 miles per hour at 25,000 feet is about 50° at the same rotational speed, whereas, with the same turbine inlet temperature and engine rotational speed, the difference in the temperatures experienced by the temperature-sensitive element in the arrangement of this invention is about 3°.

I claim:

1. A gas-turbine engine having a multi-stage turbine, each stage of which comprises a set of nozzle guide vanes and downstream thereof a row of rotor blades, and the nozzle guide vanes of a low-pressure stage of which are choked in normal operation, and a temperature-sensitive arrangement comprising a temperature-sensitive element located entirely within the leading edge of a nozzle guide vane of the low-pressure stage so as to sense the temperature at the leading edge of said low-pressure nozzle guide vane without disturbing flow conditions in the turbine whereby the choking in said low-pressure stage causes the temperature sensed by said temperature-sensitive element to be an accurate indication of the temperature of the gas entering the high-pressure stage, the accuracy of said indication being substantially unaffected by varying exhaust conditions downstream from the low-pressure stage of blading.

2. In a gas-turbine engine having a high-pressure stage and at least one low-pressure stage of blading, each stage of blading comprising a set of nozzle guide vanes and downstream thereof a row of rotor blades and the nozzle guide vanes of the low-pressure stage being choked in normal operation, a temperature-sensitive arrangement comprising a temperature-sensitive element located entirely within the leading edge of a nozzle guide vane of the low-pressure stage of the turbine so as to sense the temperature at the leading edge of said low-pressure nozzle guide vane without disturbing flow conditions in the turbine whereby the choking in said low-pressure stage causes the temperature sensed by said temperature-sensitive element to be an accurate indication of the temperature of the gas entering the high-pressure stage, the accuracy of said indication being substantially unaffected by varying exhaust conditions downstream from the low-pressure stage of blading.

References Cited in the file of this patent

UNITED STATES PATENTS

| | | |
|---|---|---|
| 2,505,796 | Sedille | May 2, 1950 |
| 2,631,677 | Kochenburger et al. | Mar. 17, 1953 |
| 2,674,843 | Lombard | Apr. 13, 1954 |
| 2,756,596 | Nelson et al. | July 31, 1956 |

FOREIGN PATENTS

| | | |
|---|---|---|
| 113,867 | Sweden | Apr. 24, 1945 |